US 9,944,501 B2

(12) United States Patent
Härkönen et al.

(10) Patent No.: US 9,944,501 B2
(45) Date of Patent: Apr. 17, 2018

(54) WIRELESS COMMUNICATIONS WITH A PAYLOAD HANDLING APPARATUS

(71) Applicant: KONECRANES GLOBAL CORPORATION, Hyvinkää (FI)

(72) Inventors: Tuomo Härkönen, Jokela (FI); Tuomas Martinkallio, Hyvinkää (FI)

(73) Assignee: KONECRANES GLOBAL CORPORATION, Hyvinkää (FI)

( * ) Notice: Subject to any disclaimer, the term of this patent is extended or adjusted under 35 U.S.C. 154(b) by 32 days.

(21) Appl. No.: 15/103,701

(22) PCT Filed: Dec. 12, 2014

(86) PCT No.: PCT/FI2014/050993
§ 371 (c)(1),
(2) Date: Jun. 10, 2016

(87) PCT Pub. No.: WO2015/086912
PCT Pub. Date: Jun. 18, 2015

(65) Prior Publication Data
US 2016/0311664 A1 Oct. 27, 2016

(30) Foreign Application Priority Data

Dec. 13, 2013 (FI) ...................................... 20136262

(51) Int. Cl.
*B66C 13/18* (2006.01)
*H04W 4/02* (2018.01)
(Continued)

(52) U.S. Cl.
CPC ............ *B66C 15/065* (2013.01); *B66C 13/44* (2013.01); *B66C 15/06* (2013.01); *B66C 19/007* (2013.01); *H04W 4/02* (2013.01)

(58) Field of Classification Search
CPC .......... B66C 13/18; B66C 15/06; H04W 4/02; H04W 88/02; G01M 17/00; G08B 21/02
(Continued)

(56) References Cited

U.S. PATENT DOCUMENTS 7,050,907 B1 * 5/2006 Janky .................... G01S 5/0018
340/989
8,224,518 B2 7/2012 Cameron
(Continued)

FOREIGN PATENT DOCUMENTS

CA        2790372 A1    3/2013
CN      101007616 A    8/2007
(Continued)

OTHER PUBLICATIONS

Supplementary European Search Report, dated Jul. 6, 2017, for European Application No. 20136262, pp. 1-7.
(Continued)

*Primary Examiner* — Tan Q Nguyen
(74) *Attorney, Agent, or Firm* — Birch, Stewart, Kolasch & Birch, LLP

(57) ABSTRACT

There is provided a computer program product, a mobile device capable of wireless communications and method for a mobile device capable of wireless communications with a payload handling apparatus for handling payload in a payload handling area. A message from the payload handling apparatus is received and on the basis of the received message it is determined when the mobile device is within the payload handling area of the payload handling apparatus.

16 Claims, 2 Drawing Sheets

(51) Int. Cl.
  *B66C 15/06* (2006.01)
  *B66C 13/44* (2006.01)
  *B66C 19/00* (2006.01)

(58) Field of Classification Search
  USPC .......................................................... 701/50
  See application file for complete search history.

(56) References Cited

U.S. PATENT DOCUMENTS

| | | | |
|---|---|---|---|
| 2010/0039319 A1* | 2/2010 | Cameron | B66C 13/16 342/357.27 |
| 2011/0187548 A1 | 8/2011 | Maynard et al. | |
| 2013/0065577 A1* | 3/2013 | Ceresoli | B66C 13/44 455/419 |
| 2013/0299440 A1 | 11/2013 | Hermann et al. | |

FOREIGN PATENT DOCUMENTS

| | | |
|---|---|---|
| CN | 102126679 A | 7/2011 |
| CN | 202400737 U | 8/2012 |
| CN | 103420291 A | 12/2013 |
| JP | 3338283 B2 | 8/2002 |
| JP | 2010-16582 A | 1/2010 |

OTHER PUBLICATIONS

Chinese Office Action and Search Report, dated Apr. 1, 2017, for corresponding Chinese Application No. 201480074629.9, with English translation.

* cited by examiner

WIRELESS COMMUNICATIONS WITH A PAYLOAD HANDLING APPARATUS

BACKGROUND

The following description of background art may include insights, discoveries, understandings or disclosures, or associations together with disclosures not known to the relevant art prior to the present invention but provided by the invention. Some such contributions of the invention may be specifically pointed out below, whereas other such contributions of the invention will be apparent from their context.

Operation of cranes and other payload handling apparatuses such as harbour cranes are increasingly automated. With increasing automation, number of personnel moving within the operating areas of the payload handling apparatuses is decreased. In a fully automated operating area, there may be no people moving in the area under normal circumstances. It is also possible that there are many automated payload handling apparatuses moving in the area. In such highly automated operating areas those areas, where personnel are allowed to move without risking their safety, may be marked to the ground. It is also possible that the handling of the payload may be stopped during the time people are moving in the area, e.g. to perform maintenance.

Safety for handling payload may be provided by sensors for detecting the people moving in the payload handling area. These sensors aid in the automated payload handling apparatuses to adjust their operation for providing safety. However, the people in the operating area have to stay in the marked areas or have faith that the sensors detect them and cause the payload handling apparatuses to adjust their operation to ensure safety.

When a harbour crane is under maintenance, it is out of production, whereby it is not in efficient use. However, in terms of economy, the downtime of an expensive apparatus like a harbour crane should be kept as rare and short as possible. Therefore, it is desirable that breaks in the operation of production machines are as short as possible. By scheduling the production breaks, it is possible to shorten the downtime, as the maintenance work can be planned better.

On the other hand even if the harbour crane is maintained as scheduled, it is possible that the scheduled maintenance is not sufficient and the harbour crane becomes inoperative or its operation is limited in between the scheduled maintenances. Such may be due to conditions of the operating environment causing an increased need for maintenance or due to the harbour crane being used in an abnormal way, e.g. for lifting very heavy loads. The unscheduled maintenances are unexpected to the skilled maintenance personnel who are few and may have pre-scheduled maintenance work in various countries for several weeks ahead. Thereby, there is likely to be delay involved in the maintenance personnel arriving to perform the unscheduled maintenance.

BRIEF DESCRIPTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

An object of the present invention is to provide a method and an mobile device for implementing the method so as to alleviate at least part of the above problems. The objects of the invention are achieved by a method, a mobile device, a computer program and a network which are characterised by what is stated in the independent claims. The preferred embodiments of the invention are disclosed in the dependent claims.

According to an aspect there is provided a method for a mobile device capable of wireless communications with a payload handling apparatus, for example a gantry crane or a bridge crane, for handling payload in a payload handling area, the method comprising receiving a message from the payload handling apparatus, and determining on the basis of the received message when the mobile device is within the payload handling area of the payload handling apparatus.

According to an aspect there is provided a mobile device capable of wireless communications comprising means for performing the steps of a method according to an aspect.

According to an aspect there is provide a mobile device comprising means for wireless communications, a processor and a memory storing a computer program, the memory and the computer program configured to, with the means for wireless communications and the processor, cause the mobile device to receive a message, by wireless communications, from a payload handling apparatus for handling payload in a payload handling area, and determining on the basis of the received message when the mobile device is within the payload handling area of the payload handling apparatus.

According to an aspect there is provided a computer program product comprising executable code that when executed, cause execution of functions of a method according to an aspect.

According to an aspect there is provided a computer program embodied on a distribution medium, comprising program instructions which, when loaded into an electronic apparatus, constitute the functionality of the mobile device described earlier.

According to an aspect there is provided a computer program embodied on a non-transitory computer readable storage medium, the computer program being configured to control a processor to perform a method according to an embodiment.

Some embodiments provide detecting, when a mobile device is within a payload handling area of the payload handling apparatus.

Operating efficiency of the payload handling apparatuses is improved, by alerting in the mobile device when a mobile device is within a payload handling area of the payload handling apparatus.

Safety of people moving in a payload handling area of the payload handling apparatus is improved, by stopping the operation of the payload handling apparatus, when the mobile device is positioned within the payload handling area.

Further improvements will become apparent from the accompanying description.

BRIEF DESCRIPTION OF THE DRAWINGS

In the following the invention will be described in greater detail by means of preferred embodiments with reference to the attached [accompanying] drawings, in which.

DETAILED DESCRIPTION

Figure 1:
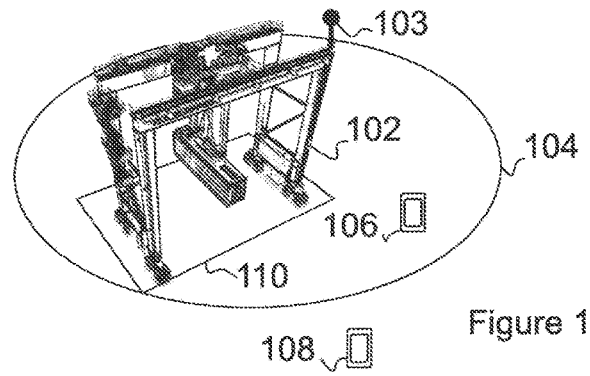
FIG. 1 illustrates a payload handling apparatus and mobile devices in the proximity and within the payload handling area of the payload handling apparatus.

FIG. 1 illustrates a payload handling apparatus 102, mobile devices 106, 108 and a payload handling area 110 of the payload handling apparatus. A mobile device moving nearby the payload handling apparatus may enter and leave the payload handling area. The payload handling apparatus may be deployed and operational in its operating area, e.g. in a harbour or a warehouse.

The payload handling apparatus may comprise a wireless transceiver 103 for wireless communications with the mobile devices. The wireless transceiver has a coverage area 104, where wireless signals transmitted from the transceiver may be received by the mobile devices. The payload handling area of the payload handling apparatus may comprise a security area, where movement of people is limited for safe operation of the payload handling apparatus. The payload handling area may be defined for example by one or more safety distances to the handled payload and/or to structures of the payload handling apparatus.

The payload handling apparatus may comprise a gantry crane or a bridge crane that are typically used to handle payload in harbours and warehouses for example.

In one example, the payload handling area of the payload handling apparatus may be visibly marked in the operating environment of the payload handling apparatus. The visible markings may be for example lines on the ground of a warehouse, where a bridge crane is operating.

In various embodiments payload may refer to movable objects that are transported between physical locations on the ground, in buildings and/or in vehicles. The movable objects may be cargo transported by vehicles between an origin, for example a harbour, and a destination, for example a warehouse. In one example, the movable objects may be containers that have standardized dimensions and are conventional in transportation of goods by ships and trucks.

A connection for wireless transfer of information such as messages between the payload handling apparatus and the mobile device 106 may be established, when the mobile device is within the coverage area of wireless communications from the payload handling apparatus. When the mobile device is outside of the coverage area it is not connected to the payload handling apparatus. The connection between the mobile device and the payload handling apparatus may be provided by radio frequency signals communicated on a radio frequency band by a transmitter and a receiver pair formed by the mobile device and the payload handling apparatus. The transmitter and receiver may employ corresponding protocols that for transfer of information between them. In one example the connection between the payload handling apparatus and the mobile device may be implemented by a Wireless Local Area Network connection according to the IEEE 802.11 family of specifications, or by a Bluetooth connection. It should be appreciated that also other wireless signals than radio frequency signals, for example infrared light, are viable for the connection. The operations of a transmitter and a receiver may be provided by adapters. In one example the adapter may be a Universal Serial Bus (USB) adapter. The transmitter and the receiver may be implemented to a single device to form a transceiver for two-way wireless communications over the wireless connection.

In an embodiment, the wireless communications between the payload handling apparatus and the mobile devices is short-range wireless communications. In the context of the payload handling apparatus a short-range of communications is referred to by any distance between a transmitter and a receiver that corresponds to at least the safety distance of the payload handling apparatus to the handled payload and/or to structures of the payload handling apparatus.

A mobile device may be capable of being moved around the operating area of the payload handling apparatus. The movability of the mobile device may be provided by the size of the device. A preferable size for providing mobility may be considered, a size that allows the device to be operated by a user for communications by the user holding the device in his/her hand, i.e. the device is a handheld device. The mobile device may be capable of wireless communications with the payload handling apparatus. The wireless communications may be provided over a wireless connection as described above. Examples of the mobile device include a mobile phone, a smartphone, a handheld computer, a laptop computer, a tablet computer and a phablet that is a class of mobile device designed to combine or straddle the functions of a smartphone and tablet.

Figure 2:
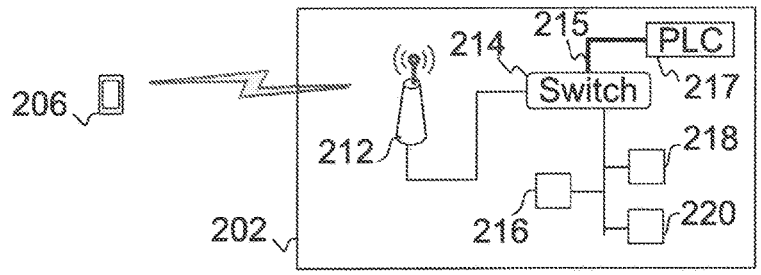
FIG. 2 illustrates communications between a mobile device and sensors installed to a payload handling apparatus, according to an embodiment.

FIG. 2 illustrates communications between a mobile device 206 and sensors 216, 218, 220 installed to a payload handling apparatus 202, according to an embodiment. The communications may be performed, when the mobile device is located within the coverage area of the wireless communications, as illustrated by the mobile device 106 and the payload handling apparatus 102 in FIG. 1.

The sensors may measure various properties of the payload handling apparatus, a part of the payload handling apparatus or the environment of the payload handling apparatus. For this purpose the location of the sensors may be determined to support these measurements. For example if properties of a rope is measured, the sensor is located in the pathway of the rope or attached to the rope. In another example if properties of a brake are measured, the sensor is located at the brake. The rope and the brake are typical examples of units of a payload handling apparatus such as cranes. It should be appreciated that different payload handling apparatuses may comprise different units that are specific to the operating environment and/or the type of payload that is handled.

Examples of sensors for measuring properties of the payload handling apparatus or a part of the payload handling apparatus comprise sensors including for example a sensor for electric current, a magnetic field and/or acceleration.

Examples of sensors for measuring the environment of the payload handling apparatus comprise sensors for temperature, humidity, external shocks and/or corrosion.

The sensor may be connected to a wireless transmitter 212 for communications with the mobile device. The wireless transmitter may be a transceiver for two-way wireless communications. An example of the transmitter comprises a WLAN Access Point (WLAN AP). The WLAN AP may be detected by the mobile device having a WLAN communications capability provided for example by a WLAN adapter or WLAN circuitry. The mobile device may join the WLAN AP for wireless communications with the sensors. The AP may operate as a bridge between the sensors and the mobile device.

The sensors may be connected to the wireless transmitter 212 by a wired or wireless connection. The wireless communications between the transceiver and the sensors provides flexible and quick positioning of the sensors, since no cabling is needed for the communications between the transceiver and the sensors. The wireless communications may be implemented by a WLAN connection. In this way the sensors join the service set of the AP and are located in the same local area network with the mobile device. The wired connection may comprise Ethernet or an industrial bus, for example Profibus (Process Field Bus) and CANopen.

FIG. 2 illustrates a wired connection between the sensors and the wireless transmitter. The wired connection may be provided through a switch 214 that connects an industrial bus 215 to the sensors. A controller 217 that controls operations of the payload handling apparatus may be connected to the switch. In this way measurements from the sensors may be provided to the controller for controlling the payload handling apparatus. In cranes the controller is typically a Programmable Logic Controller (PLC) that controls various functions, for example brakes, hoisting machinery and steering operations in cranes.

In an embodiment, the mobile device may be connected to the controller by the switch. The mobile device may communicate data over the connection with the controller such that a user interface of the controller and/or payload handling apparatus may be provided on the mobile device. The data may comprise control information that causes the payload handling apparatus to move a payload attached to the payload handling apparatus and/or a part of the payload handling apparatus for attaching to the payload. The movement may be caused by using the data for controlling a drive system that is responsible for driving the payload handling apparatus, payload or a part of the payload handling apparatus. In one example the data causes movement of a trolley, hook and/or a spreader of the payload handling apparatus. The user interface may comprise one or more graphical objects that may be selected by the user. Selection of one or more of the objects may cause the movement of the trolley, hook and/or a spreader of the payload handling apparatus. The data may comprise at least or additionally video from one or more cameras attached to the payload handling apparatus: The cameras may be directed to a payload handling area of the payload handling apparatus such that the payload handling area may be viewed on the user interface and/or handling of the payload may be viewed on the user interface. The cameras may be positioned to various locations in the payload handling apparatus. The locations may include a trolley, a hook, a spreader and other structures of the payload handling apparatus described above. Instead or additionally to video from cameras, data may be obtained from sensors connected to the payload handling apparatus for displaying the data on the user interface. The user interface may be provided by an application that may be executed on the mobile device. The mobile device may provide a platform for execution of applications. Examples of the platform may be operating systems such as iOS and Windows Phone and Android that are currently used in many mobile devices in the market.

The wired connections between the switch and the wireless transmitter, and between the switch and the sensors, may be implemented by Ethernet connections. It should be appreciated that one or more sensors may be connected directly to the wireless transmitter. This may be preferred when their measurements are not needed in controlling the payload handling apparatus, e.g. by the PLC. Also, it is possible that the switch 214 may be omitted and the sensors connect directly to the wireless transmitter.

Figure 3:
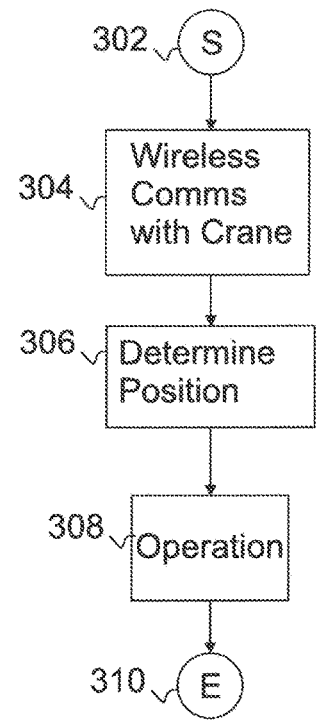
FIG. 3 illustrates a method for a mobile device capable of wireless communications with a payload handing apparatus for handling payload in a payload handling area, according to an embodiment.

FIG. 3 illustrates a method for a mobile device capable of wireless communications with a payload handing apparatus for handling payload in a payload handling area, according to an embodiment. The mobile device may be moving in an operating area of the payload handling apparatus as illustrated in FIG. 1. In the method, the mobile device determines when it is within the payload handling area, whereby the safety of the user carrying the mobile device may be considered in operating the payload handling apparatus and/or in communications with the user via a user interface of the mobile device.

The user interface may include one or more functionalities that give feedback to a user's senses and/or allow the user to enter commands to the mobile device. The feedback may be given for the user's vision, sense of touch and/or hearing, for example. Examples of units for giving feedback to the user comprise one or more a display and/or a vibrator. When the mobile device is within the payload handling area, the user interface may be used to alert the user of the mobile device using the feedback units such that the user can obtain information that he/she is in the payload handling area. In this way the user may consider his/her safety and move out of the payload handling area.

On the other hand, when the mobile device is within the payload handling area and also within the coverage area of the payload handling apparatus, information of condition level of the payload handling apparatus or a part of the payload handling apparatus may be transferred to the mobile device over a wireless connection. The information of condition level maybe used in the mobile device and/or by the user of the mobile device to determine possible inspections and maintenance while in the proximity of the payload handling apparatus. The proximity of the payload handling apparatus allows inspecting the payload handling apparatus and thereby an accurate scheduling of future maintenances on the basis of the information of the condition level.

The method of FIG. 3 may start 302, when the mobile device is operational and capable of receiving wireless transmissions, e.g. messages, from the payload handling apparatus. Accordingly, the mobile device should be at least within the coverage area of wireless communications from the payload handling apparatus. The wireless transmissions may be received by a receiver over a wireless connection implemented according to the WLAN or Bluetooth for example.

In 304, the mobile device receives a wireless transmission from the payload handling apparatus. The transmission may be a message including information identifying the payload handling apparatus and/or a specific part of the payload handling apparatus. The information may comprise an identifier, e.g. a serial number or an address that identifies the payload handling apparatus or a specific part of the payload handling apparatus as a source of the message. The specific part may be a brake, a rope, a sensor, or a wireless transmitter of the payload handling apparatus.

In one example, the wireless connection between the mobile device and the payload handling apparatus is implemented by WLAN, and the received message is a beacon message carrying a Service Set IDentifier (SSID) that identifies the payload handling apparatus. In another example the received message may comprise a condition level of the payload handling apparatus and/or information, for example an alert from a sensor installed to the payload handling apparatus. The condition level and the alert may be specific to a part, e.g. a brake or a rope, of the payload handling apparatus, but they may also concern the payload handling apparatus as a whole.

In an embodiment, the mobile device transmits a message to the payload handling apparatus, when the mobile device is within a coverage area of wireless communications with the payload handling apparatus and the mobile device receives 304 a message from the payload handling apparatus in response to the transmitted message. The transmission from the mobile device may be a Hyper Text Transfer Protocol (HTTP) request and the following response may be a HTTP response.

The transmission and/or reception of messages between the mobile device and the payload handling apparatus may follow an establishment procedure of a wireless connection. This procedure may be specific to the wireless communications protocol and vary between different wireless communications protocols. The establishment procedure may further include configuring one or more protocol entities for transmission and/or reception of messages on the wireless connection.

In one example of the establishment procedure using WLAN for the wireless communications, the mobile device synchronizes to beacons transmitted from a WLAN AP installed to the payload handling apparatus. In this way the mobile device may receive transmissions from the payload handling apparatus. The WLAN AP may have a Dynamic Host Configuration Protocol (DHCP) for issuing the mobile device an Internet Protocol (IP) address. Once the mobile device has obtained the IP address, the mobile device may receive one or more IP messages, e.g. a HTTP response, from the payload handling apparatus.

In 306 it the mobile device may determine on the basis of the received message when the mobile device is within the payload handling area of the payload handling apparatus. In one example, the payload handling area of the payload handling apparatus comprises the coverage area of wireless communications such that the coverage are is completely or at least substantially within the payload handling area. Then, a successful reception of the message may be used to determine that the mobile device is within the payload handling area. The successful reception may be determined on the basis of a successful decoding of the received message.

In an embodiment the received message may include coordinate information. The mobile device may determine its position with respect to received coordinate information and thereby, whether the mobile device is within the payload handling area. The mobile device may determine its own position by one or more positioning means. The positioning means may comprise a Global Positioning System (GPS), and various indoor positioning systems, e.g. WLAN based positioning systems, or a combination of GPS and the indoors positioning systems. For this purpose, the mobile device may be equipped with the positioning means, as are provided in many present day smart phones, for example. Alternatively, eth mobile device may obtain its position from an external GPS device connected to the mobile device by a wired or a wireless connection, e.g. by Bluetooth. The received coordinate information from the payload handling apparatus may define the payload handling area of the cargo handling apparatus. The area may be defined in a specific coordinate system, e.g. in a geographical coordinate system such as the WGS84, when the coordinate information includes Global Positioning System (GPS) coordinates.

In 308, an operation of the mobile device is determined on the basis of the determined 306 position. An alert may be caused on the user interface of the mobile device, when the mobile device is within the payload handling area of the wireless payload handling apparatus. It is possible also to derive information from the received 304 message to determine, whether the alert should be caused or not.

There are various possibilities to determine that the alert should be caused. In one example, the derived information may indicate that the received message originates from the payload handling apparatus and/or a sensor attached to the payload handling apparatus, whereby it may be determined to cause the alert. In another example the derived information may include a condition level, whereby it may be determined to cause the alert. The condition level may have a plurality of values, e.g. fault, alarm and good. The received condition level may be evaluated to a threshold value for the condition level for causing an alert, when the received condition level satisfies the threshold. In one example the threshold may be set to "good", whereby only condition values lower than the threshold, i.e. "alarm" or "fault", is received.

It should be appreciated that the above examples of information derived from the received message may be combined to determine to cause the alert on the basis of a combination of the derived information.

On the other hand, when the mobile device is not within the payload handling area of the payload handling apparatus, no alert may be generated via the user interface of the mobile device.

In an embodiment the alert may comprise displaying information and/or tactile feedback to the user of the mobile device. The tactile feedback may be provided by a vibrator and the displaying may be provided by a display of the mobile device. It should be appreciated that the user interface functions, e.g. the display and the vibrator, may be implemented in separate units from the mobile device that communicates with the payload handling apparatus. These units may communicate with the mobile device for executing the alerting functionality.

The information displayed in the alert may comprise information comprising a condition level. The user interface of the mobile device may comprise one or more or more views for displaying the information. The views may correspond to condition levels of the payload handling apparatus or condition levels of a part of the payload handling apparatus. The condition level received from the payload handling apparatus may be used determine the view to be displayed. The condition level may be received from the payload handling apparatus over the wireless connection as described above. In this way the user of the mobile device is provided information of the condition level and the mobile device may adapt the condition level for fast viewing on the user interface by using the views that correspond to the condition levels.

In an embodiment, there may be a plurality of condition levels, whereby some condition levels may be determined to cause an alert while other condition levels may be determined not to cause an alert. Also the alert caused by one condition level may be different from an alert caused by another condition level. This embodiment may be explained in more detailed with FIG. 4.

In an embodiment, the operation of the mobile station on the basis of the determined operation may comprise transmitting the determined position or information of the determined position to the payload handling apparatus. In this way the payload handling apparatus may adapt its operation on the basis of the determined position received from the mobile device. In this way safety may be provided to the user of the mobile device, since the user is typically holding the mobile device in his/her hand or pocket. The adapting may comprise stopping the operation of the payload handling apparatus, when the mobile device is positioned within the payload handling area. Accordingly, the payload handling apparatus may stop handling of the payload on the basis of determining that the mobile device is within the payload handling area of the payload handling apparatus. In one example, the payload handling apparatus comprises a crane that is hoisting a cargo container, whereby the hoisting is stopped. This may be performed by controlling hoisting machinery via the crane's internal control system, for example.

The process ends in 310 after the position of the mobile device has been used in the operation of the mobile device and/or the operation of the payload handling apparatus.

Figure 4:
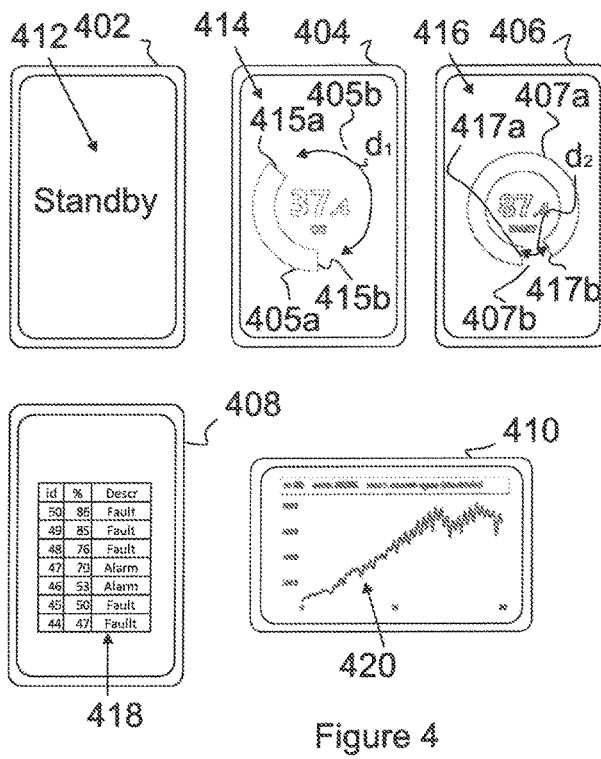
FIG. 4 illustrates a user interface of a mobile device device capable of wireless communications with a payload handing apparatus, according to an embodiment.

FIG. 4 illustrates a user interface 412, 414, 416, 418, 420 of a mobile device 402, 404, 406, 408, 410 capable of wireless communications with a payload handing apparatus, according to an embodiment. The mobile device may be moving outside and inside of the coverage are of wireless communications as illustrated in FIG. 1. In FIG. 4, various views for the user interface are illustrated. These views may be displayed on the basis of received information from the payload handling apparatus as described in the method of FIG. 3.

A view of the user interface 412 may be displayed, when the mobile device is outside of the coverage area of the wireless communications and prior to receiving any information from the sensors. In one example, a maintenance person is holding the mobile device, when moving towards a payload handling apparatus he is assigned to inspect. When still moving towards the payload handling apparatus to be inspected, the maintenance person is outside the coverage area of the wireless communications and also outside of the payload handling area of the payload handling apparatus. Then the user interface may indicate that no information is available from the payload handling apparatus. The indication may comprise a textual message "standby". Accordingly, the user interface does not alert the user of the mobile device.

A view 414, 416, 418, 420 of the user interface may be displayed after information is received from the sensors of the payload handling apparatus. These views may be used to cause an alert in the mobile device. The views comprise a condition level of the payload handling apparatus or a part of the payload handling apparatus. Examples of the parts comprise a brake and a rope. The condition levels may comprise for example: "fault", "alarm", "good". The condition levels may have corresponding views to highlight the condition level that is alerted on the display.

The condition level "fault" may indicate that maintenance is needed and payload handling should be stopped. The condition level "alarm" may indicate that the payload handling may be continued but maintenance should be scheduled. When the condition level is "good", the operation of the payload handling apparatus may be continued without further maintenance.

In an embodiment the condition level is displayed by a circular element that has a portion corresponding to an amount of the condition level that is remaining and another portion corresponding to an amount of the condition level that is lost. In this way the condition level may be visualized for fast interpretation of the condition level. The circular element may be implemented by two superposed circles, for example.

The amounts may be for example relative values, e.g. percentages. The portions may be defined as two portions 405a, 405b, 407a, 407b of the circumference of the circular element. The portions may be continuous such that each portion has two ends 415a, 415b, 417a, 417b, on the circumference and the portions extend on the circumference between the ends. In this way the amount of the condition level remaining and/or the amount of the condition level lost may be determined from the distance $d_1$, $d_2$ between the ends of the corresponding portion. It should be appreciated that only one portion, e.g. a portion corresponding either to the lost 405b, 407b or remaining 405a, 407a condition level facilitates determining the corresponding amount by the distance between the ends of the portion.

Also other geometric forms are viable for the circular element than circles. When the extremes of "full" condition level or a '0' condition level are indicated in this way, a circle with only one portion may be shown. The amount of remaining condition level and the amount of lost condition level may be highlighted with different colours. In this way the two portions of the circular element, and especially the extremes of the "full" condition level and the '0' condition level, may be quickly distinguished. In one example, the remaining condition level may be highlighted by green colour and the lost condition level may be highlighted by red colour.

The view 414 illustrates an example of displaying the "good" condition level by a circular element having two portions. The user interface 416 illustrates an example of displaying a fault condition level by a circular element having two portions.

The view 418 includes a table of information received from sensors of a payload handling apparatus. The table includes identifiers of the measured parts of the payload handling apparatus and information of the condition level of the measured part and description of the condition level.

The view 420 includes a graph displaying information received from the sensors. The graph may represent measured values from the sensors.

In an embodiment, when the mobile device is within the payload handling area of the payload handling apparatus the user is displayed at least one of the views 414 to 420. Preferably, the user is displayed a circular element displaying the condition level as in views 414, 416. In this way, the condition level may be determined from the view by a simple check of whether the circumference has a single part or more than one part, and if the circumference has a single part, the colour of the single part may indicate the condition level at the either extreme, e.g. full or '0'.

In an embodiment, a value representing a condition level of the payload handling apparatus may be positioned in the middle of the circular element having one or more portions corresponding to the condition level. In this way the exact value of the remaining or lost condition level may be shown to the user of the mobile device.

Further views of graphs 420 and 418 may be displayed based on eth user's selection received via the user interface. It should be appreciated that any of the views 414 to 420 may be displayed as an alert on the mobile device.

Figure 5:
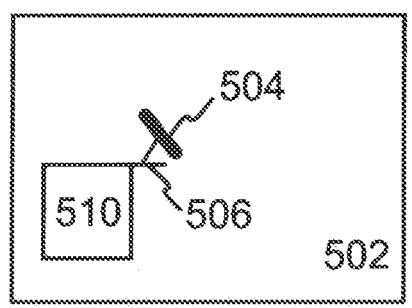
FIG. 5 illustrates a support structure for a mobile device according to an embodiment.

FIG. 5 illustrates a support structure 506 for a mobile device 504 according to an embodiment. The support structure may be located in a technical space 502 of a payload handling apparatus. The technical space provides protection against weather, for example rain, sun light and temperature changes, to the mobile device. The mobile device may be capable of wireless and/or wired communications with a payload handing apparatus such that the payload handling apparatus may be controlled by an operator via a user interface of the mobile device.

The technical space may be a cabin or a technical room for example. A cabin typically includes a seat for an operator of the payload handling apparatus. The operator responsible for operating the payload handling apparatus may be seated in the cabin during his work-shift. The technical room may refer to a room or space in the payload handling apparatus, where equipment needing protection against weather may be located. Accordingly, the technical room may be similar to the cabin, but there may be no room, e.g. a seat, for people.

The technical space may include a controller 510 that controls operations of the payload handling apparatus, or an interface to the controller. The mobile device may communicate with the controller to enable control of the payload handling apparatus to the operator. An example of the controller is described by item 217 above with FIG. 2. In addition to the controller, all or at least part of the devices illustrated within the payload handling apparatus 202 may be located within the technical space.

The support structure may provide a connector for attaching to the mobile device. In this way the mobile device may attached to the support structure and within the technical space. The connector may further provide that the mobile device may be disconnected from the support structure. In this way the mobile device may be removed from the technical space and used outside the technical space in a payload handling area of the payload handling apparatus.

The connector may attach to the mobile device by generating a pressure that may be applied to the mobile device. The pressure may be applied to the mobile device on one or more sides of the mobile device. In one example the pressure may be applied on opposite sides of the mobile device. In one example a clamp may be used to cause the pressure. On the other hand the connector may attach to the mobile device by a lock mechanism. The lock mechanism and the mobile device may co-operate such that, the mobile device and the lock mechanism have co-operating members that are locked to each other, when they are brought together. The co-operating members may need to be pressed together or rotated with respect to each other to lock the mobile device to the support structure. The connector may be disconnected by operating the connector manually in a reverse manner to the attachment procedure. In one example the locking mechanism may be opened by rotating the co-operating members with respect to each other in a direction counter to the direction of rotation for locking the members. In another example, pressure applied on the mobile device may be released by manually operating the clamp against the pressure. In an embodiment, a mobile device may be connected to a controller in a technical space for communications of data between a controller of a payload handling apparatus and the mobile device. Data received from the controller may be used to present a user interface of the controller on the mobile device to the user of the mobile device. In this way the mobile device may be used for controlling the payload handling apparatus. The controller may be the controller described with FIG. 2. The technical space may the technical space illustrated in FIG. 5. The connection to the controller may be a wired connection and/or a wireless connection. The wireless connection is preferably available in a payload handling area of the mobile device. The wireless connection may be a Wireless Local Area Network connection according to the IEEE 802.11 family of specifications. In one example the mobile device may be connected wirelessly to a wireless transmitter and/or receiver, e.g. a WLAN AP, of the payload handling apparatus. The wireless transmitter and/or receiver may be connected to the controller via a switch according to FIG. 2. In another example, the connection to the controller may be provided by a wired USB connection of the mobile device to the wireless transmitter, switch or the controller. A connector for the wired USB connection may be arranged in a support structure in the technical space such that attachment of the mobile device to the support structure connects the mobile device to the USB connector. The wired connection may be used for charging the mobile device's battery via the USB connection, for example to the controller, during the attachment of the mobile device to the support structure.

Controlling the payload handling apparatus may comprise driving the payload handling apparatus. The driving may comprise controlling various functions, for example brakes, hoisting machinery and steering operations in cranes. In this way payload may be handed, e.g. lowered to the ground or picked up from the ground or stack, by the payload handling apparatus.

The user interface of the controller for controlling the payload handling apparatus may be provided by visual objects that are selectable through a user interface of the mobile device. The visual objects may comprise graphical objects on a display of the mobile device. The mobile device may comprise a display that is preferably a touch screen for receiving user input for selecting the displayed visual objects. The visual objects may be presented on the display by one or more groups of pixels. The touch screen may support gestures such as swiping and/or multi-touch functionality for facilitating selection of one or more of the visual objects. The multi-touch functionality may refer to the ability of the touch screen to recognize a presence of more than two points of contact with the surface of the touch screen. This allows pinching and zooming to information presented on the touch screen.

Selection of the visual objects may be used to drive the payload handling apparatus and/or payload attached to the payload handling apparatus. Accordingly, the payload handling apparatus may be driven on the basis of gestures applied on the touch screen of the mobile device. The user interface of the mobile device may include one or more functionalities that give feedback to a user's senses and/or allow the user to enter commands to the mobile device. The feedback may be given for the user's vision, sense of touch and/or hearing, for example. Examples of units for giving feedback are described above with FIG. 3.

In an embodiment, a mobile device may be wirelessly connected to a controller of a payload handling apparatus, when the mobile device is disconnected from a support structure in a technical space of the payload handling apparatus, and connected to the controller over a wired connection, when the mobile device is attached to the support structure. In this way, the wireless connection may be optimized to provide coverage outside the technical space. The wired connection may be used for both charging and communications of the mobile device simultaneously. The controller may be the controller described with FIG. 2. The technical space may the technical space illustrated in FIG. 5.

An embodiment comprises use of a mobile device for controlling a payload handling apparatus. During controlling the mobile device may be wirelessly connected to the payload handling apparatus, e.g. to a controller of the payload handling apparatus. The wireless connection may be provided in a payload handling area of the payload handling apparatus. In this way the user of the mobile device may move within the payload handling area of the payload handling apparatus such that the user may perform visual inspection of payload in the payload handling area while controlling the payload handling apparatus. This is particularly advantageous in payload handling areas and payload handling apparatuses, where a direct line-of-sight to the payload may be prevented by another payload and/or stacks of payload. The controlling may comprise driving of the payload handling apparatus. The driving of the payload handling apparatus may be achieved by selection of visual objects on a user interface of the mobile device as described above.

An embodiment provides a computer program embodied on a distribution medium, comprising program instructions which, when loaded into an electronic apparatus, cause the execution of steps of a method according to an embodiment.

The computer program may be in source code form, object code form, or in some intermediate form, and it may be stored in some sort of carrier, which may be any entity or device capable of carrying the program. Such carriers include a record medium, computer memory, read-only memory, electrical carrier signal, telecommunications signal, and software distribution package, for example. Depending on the processing power needed, the computer program may be executed in a single electronic digital computer or it may be distributed amongst a number of computers.

An embodiment provides a mobile device comprising means for wireless communications, a processor and a memory storing a computer program, that when executed cause the mobile device to receive a message, by wireless communications, from a payload handling apparatus for handling payload in a payload handling area, and determining on the basis of the received message when the mobile device is within the payload handling area of the payload handling apparatus. The means for wireless communications may be provided by a transmitter, a receiver and/or a transceiver as described above.

A mobile device may be implemented as an electronic digital computer, which may comprise a working memory (RAM), a central processing unit (CPU), and a system clock. The CPU may comprise a set of registers, an arithmetic logic unit, and a control unit. The control unit is controlled by a sequence of program instructions transferred to the CPU from the RAM. The control unit may contain a number of microinstructions for basic operations. The implementation of microinstructions may vary, depending on the CPU design. The program instructions may be coded by a programming language, which may be a high-level programming language, such as C, Java, etc., or a low-level programming language, such as a machine language, or an assembler. The electronic digital computer may also have an operating system, which may provide system services to a computer program written with the program instructions.

An embodiment provides a computer program embodied on a distribution medium, comprising program instructions which, when loaded into an electronic apparatus, constitute the functionality of the mobile device described earlier.

An embodiment provides a computer program embodied on a non-transitory computer readable storage medium, the computer program being configured to control a processor to perform a method according to an embodiment.

It should be appreciated that one or more parts, structures or functionalities described in an embodiment may be combined to another embodiment.

It will be obvious to a person skilled in the art that, as technology advances, the inventive concept can be implemented in various ways. The invention and its embodiments are not limited to the examples described above but may vary within the scope of the claims.

The invention claimed is:

1. A method for a mobile device comprising a user interface, the mobile device being capable of wireless communications with a payload handling apparatus for handling payload in a payload handling area, the method comprising the steps of:
receiving a message from the payload handling apparatus;
determining on the basis of the received message when the mobile device is within the payload handling area of the payload handling apparatus; and
causing an alert on the user interface, on the basis of the received message, when the received message includes a condition level of the payload handling apparatus or a part of the payload handling apparatus.

2. The method according to claim 1, further comprising the step of:
causing an alert on the user interface, when the mobile device is within the payload handling area of the payload handling apparatus.

3. The method according to claim 2, further comprising the steps of:
deriving information from the received message; and
determining to cause the alert on the basis of the derived information indicating the payload handling apparatus or a sensor attached to the payload handling apparatus as the source of the message.

4. The method according to claim 1, further comprising the steps of:
determining that the mobile device is within the payload handling area of the payload handling apparatus;
determining a position of the mobile device; and
transmitting the determined position or information of the determined position to the payload handling apparatus for adapting the operation of the payload handling apparatus.

5. The method according to claim 1, wherein the wireless communications is provided by a coverage area of wireless signals from the payload handling apparatus, and the payload handling area is a part of the coverage area.

6. The method according to claim 1, wherein the wireless communications comprises a wireless local area network provided by a wireless transceiver arranged to the payload handling apparatus, and the wireless transceiver being connected to one or more sensors of the payload handling apparatus via the wireless transceiver.

7. The method according to claim 1, wherein the user interface includes a display and at least one view for the display, said view corresponding to a condition level of the payload handling apparatus or a condition level of a part of the payload handling apparatus, the method further comprising the steps of:
receiving a message from a sensor attached to the payload handling apparatus or a part of the payload handling apparatus;
deriving a condition level measured by the sensor from the message; and
determining a view to be displayed on the basis of the derived condition level.

8. The method according to claim 7, wherein the user interface includes a plurality of views for the display and the method further comprises the step of:

displaying the view from the plurality of views that corresponds to a condition level received from a sensor attached to the payload handling apparatus or a part of the payload handling apparatus.

9. The method according to claim 1, wherein the user interface includes a display and at least one view, where a condition level of the payload handling apparatus or a part of the payload handling apparatus is displayed by a circular element having at least two portions arranged on the circumference of the circular element, wherein the portions comprise a first portion corresponding to an amount of the condition level that is remaining and a second portion corresponding to an amount of the condition level that is lost.

10. The method according to claim 1, wherein the user interface includes a display and at least one view, where a condition level of the payload handling apparatus or a part of the payload handling apparatus is displayed by a circular element having a circumference and portion on the circumference extending between two ends of the circular element, said ends being arranged on the circumference, wherein the distance between the condition level of the payload handling apparatus or a part of the payload handling apparatus is defined by a distance between the ends on the circumference.

11. The method according to claim 1, wherein an alert is caused on the user interface, when the received message indicates a condition level that meets a threshold value for the condition level from a plurality of condition levels of the payload handling apparatus.

12. The method according to claim 1, wherein the wireless communications comprises communications over a wireless local area network, WLAN, connection or over a Bluetooth connection.

13. The method according to claim 1, wherein the payload handling apparatus is a gantry crane or a bridge crane.

14. A mobile device capable of wireless communications with a payload handling apparatus for handling payload in a payload handling area, the mobile device comprising means for performing the steps of:
receiving a message from the payload handling apparatus;
determining on the basis of the received message when the mobile device is within the payload handling area of the payload handling apparatus; and
causing an alert on the user interface, on the basis of the received message, when the received message includes a condition level of the payload handling apparatus or a part of the payload handling apparatus.

15. The mobile device according to claim 14, wherein the payload handling apparatus is a gantry crane or a bridge crane.

16. A computer program embodied on a non-transitory computer readable storage medium, the computer program being configured to control a processor to perform the steps of:
receiving, by wireless communications between a mobile device and a payload handling apparatus, a message from the payload handling apparatus;
determining on the basis of the received message when the mobile device is within the payload handling area of the payload handling apparatus; and
causing an alert on the user interface, on the basis of the received message, when the received message includes a condition level of the payload handling apparatus or a part of the payload handling apparatus.

* * * * *